United States Patent
Banga et al.

(10) Patent No.: US 8,364,825 B2
(45) Date of Patent: Jan. 29, 2013

(54) NETWORK CONNECTION MANAGER

(75) Inventors: Gaurav Banga, Cupertino, CA (US); Giridhar Pemmasani, San Jose, CA (US); Vishwanathan Rajendran, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 576 days.

(21) Appl. No.: 12/322,670

(22) Filed: Feb. 4, 2009

(65) Prior Publication Data

US 2010/0174820 A1 Jul. 8, 2010

Related U.S. Application Data

(60) Provisional application No. 61/204,598, filed on Jan. 7, 2009.

(51) Int. Cl.
*G06F 15/16* (2006.01)
*G06F 9/455* (2006.01)
*H04W 24/00* (2009.01)

(52) U.S. Cl. ..... 709/227; 709/228; 709/249; 455/456.1; 718/1; 703/23

(58) Field of Classification Search ................... 709/228, 709/249; 455/456.1; 718/1; 703/23
See application file for complete search history.

(56) References Cited

U.S. PATENT DOCUMENTS

| | | | | |
|---|---|---|---|---|
| 6,336,138 | B1 * | 1/2002 | Caswell et al. | 709/223 |
| 7,272,397 | B2 * | 9/2007 | Gallagher et al. | 455/436 |
| 7,814,307 | B2 * | 10/2010 | Powell et al. | 713/2 |
| 7,860,978 | B2 * | 12/2010 | Oba et al. | 709/227 |
| 2003/0003933 | A1 * | 1/2003 | Deshpande et al. | 455/510 |
| 2006/0234722 | A1 * | 10/2006 | Hanebeck et al. | 455/456.1 |
| 2007/0032225 | A1 * | 2/2007 | Konicek et al. | 455/417 |
| 2008/0005290 | A1 * | 1/2008 | Nykanen et al. | 709/222 |

FOREIGN PATENT DOCUMENTS

| | | |
|---|---|---|
| JP | 2001-309445 | 11/2001 |
| JP | 2008-107896 | 5/2008 |
| WO | WO2004/031488 | 4/2004 |
| WO | WO2008/034877 | 3/2008 |

OTHER PUBLICATIONS

International Searching Authority, Invitation to Pay Additional Fees and, Where Applicable Protest Fee, dated Oct. 5, 2010, pp. 8.

* cited by examiner

*Primary Examiner* — Ranodhi Serrao

(57) ABSTRACT

Methods, systems, apparatuses and program products are disclosed for managing connections to telecommunications networks, especially networks that deploy Internet Protocols and the like.
Provision is made for colligating a connectivity ruleset, inter-converting status data to form a dataset of candidate communication links, and supplicating a network connection. Also for forming physical location profiles and selecting a network on that basis and upon a basis of a present physical location of the respective computer.

20 Claims, 5 Drawing Sheets

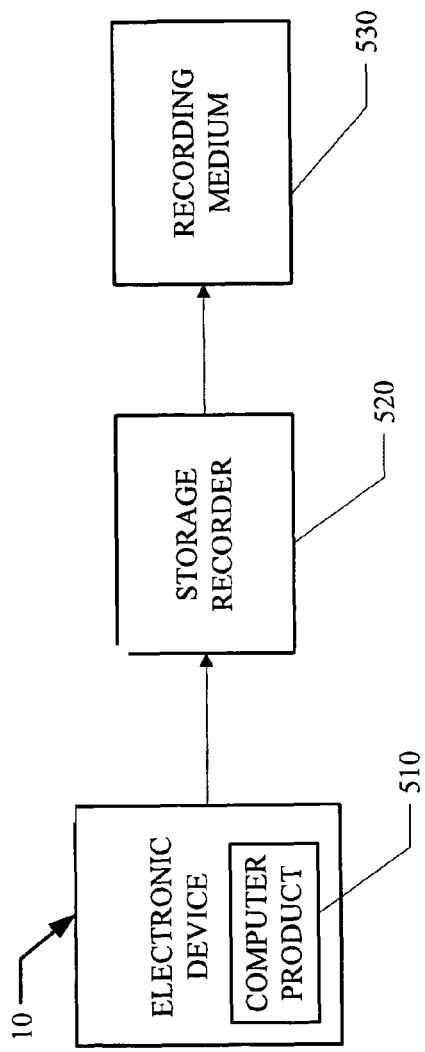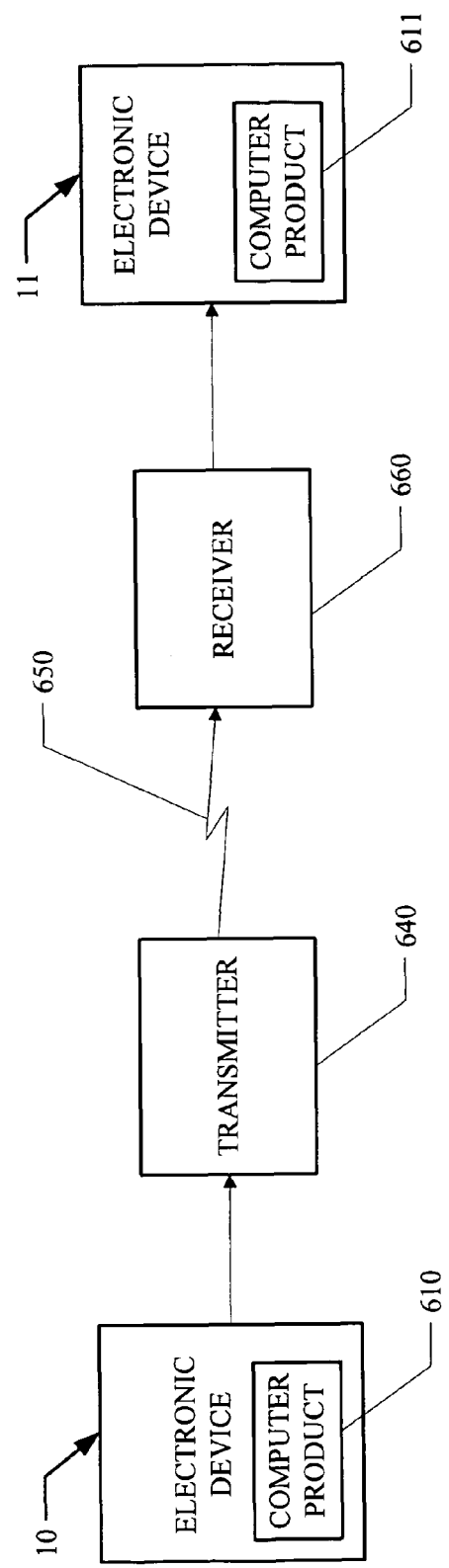

NETWORK CONNECTION MANAGER

CROSS-REFERENCE TO RELATED APPLICATION

This application claims priority to U.S. Patent provisional application Ser. No. 61/204,598, entitled NETWORK CONNECTION MANAGER, filed on Jan. 7, 2009.

FIELD OF THE INVENTION

The present invention generally relates to personal computers and devices sharing similar architectures and, more particularly relates to a system and corresponding method for managing and activating connections to telecommunications networks, especially networks that deploy Internet Protocols and the like.

BACKGROUND OF THE INVENTION

Modernly, usage of mobile PCs (personal computers) is quite commonplace, yet still growing. Substantially all PCs are connected to the Internet at least part of time they are actively being used as a PC by a user. For mobile PCs this raises particular challenges in that they are likely to be exposed to multiple ISPs (Internet Service Providers) and to multiple physical connection types and modes to even a preferred ISP. Moreover, they may operate under materially changing conditions.

Mobile PCs, such as Notebook computers (laptop computers) may commonly be used in the following exemplary manner: A user may activate the PC (such as by opening the mobile PC's lid or display screen) and actively use the functions of installed applications and software while being geographically stationary. Later, the user may shut down the PC, such as by closing the lid or display screen, and then not actively use it for a short, or an extended period of time. When the PC is not being used it may typically be maintained in some form of reduced power consumption mode especially if battery powered and for energy management issues more generally.

Upon reactivation, a mobile PC may commonly be in the same geographic location (and orientation) as during the previous active session or, also commonly, in a different location. The physical/geographic location will typically be a factor in the type of network connection used, especially in the common case that the computer is connected to the Internet, at least while in active use. Whatever algorithms are used with respect to ISPs (Internet Service Providers), all situations need to be handled expeditiously.

Mobile PCs may typically be able to connect to the Internet using wireless adapters and/or through a wired connection (protocol) standard, for example, IEEE 802.3 standard. Moreover, due to their mobility, mobile PCs are likely to have to connect to a number of different ISPs and/or a preferred ISP through any a multiplicity of types and modes of connection according to location and many other considerations.

Conventional connection implementations fail to provide a sufficiently convenient and rapid connection to a network and also may fail to sufficiently optimize link selection and connection thereto. Thus, the disclosed improved computer designs include embodiments of the present invention and enable (inter alia) superior tradeoffs in regards to the problems and shortcomings outlined above.

SUMMARY OF THE INVENTION

The present invention overcomes the aforementioned and related shortcomings discussed above. The present invention provides a method for operating a computer for data communications and also an apparatus that embodies the method. In addition program products and other means for exploiting the invention are presented. According to an aspect of the present invention an embodiment of the invention may provide for colligating a connectivity ruleset, interconverting status data to form a dataset of candidate communication links, this may be accomplished by heuristic modification of a persistent computer database. Then supplicating a network connection, for example, by negotiating and binding a session with an ISP and associated action.

According to a further aspect of the present invention, an embodiment of the invention may also provide for forming physical location profiles, for example, by recording geographic locators and associated servers. Then, selecting a network on that basis and upon a basis of a present physical location of the respective computer.

An advantage and/or feature provided by or resulting from implementing the present invention is more efficient data communications.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 5 shows how an exemplary embodiment of the invention may be encoded onto a computer medium or media; and FIG. 6 shows how an exemplary embodiment of the invention may be encoded, transmitted, received and decoded using electromagnetic waves.

DETAILED DESCRIPTION OF THE INVENTION

Figure 1:
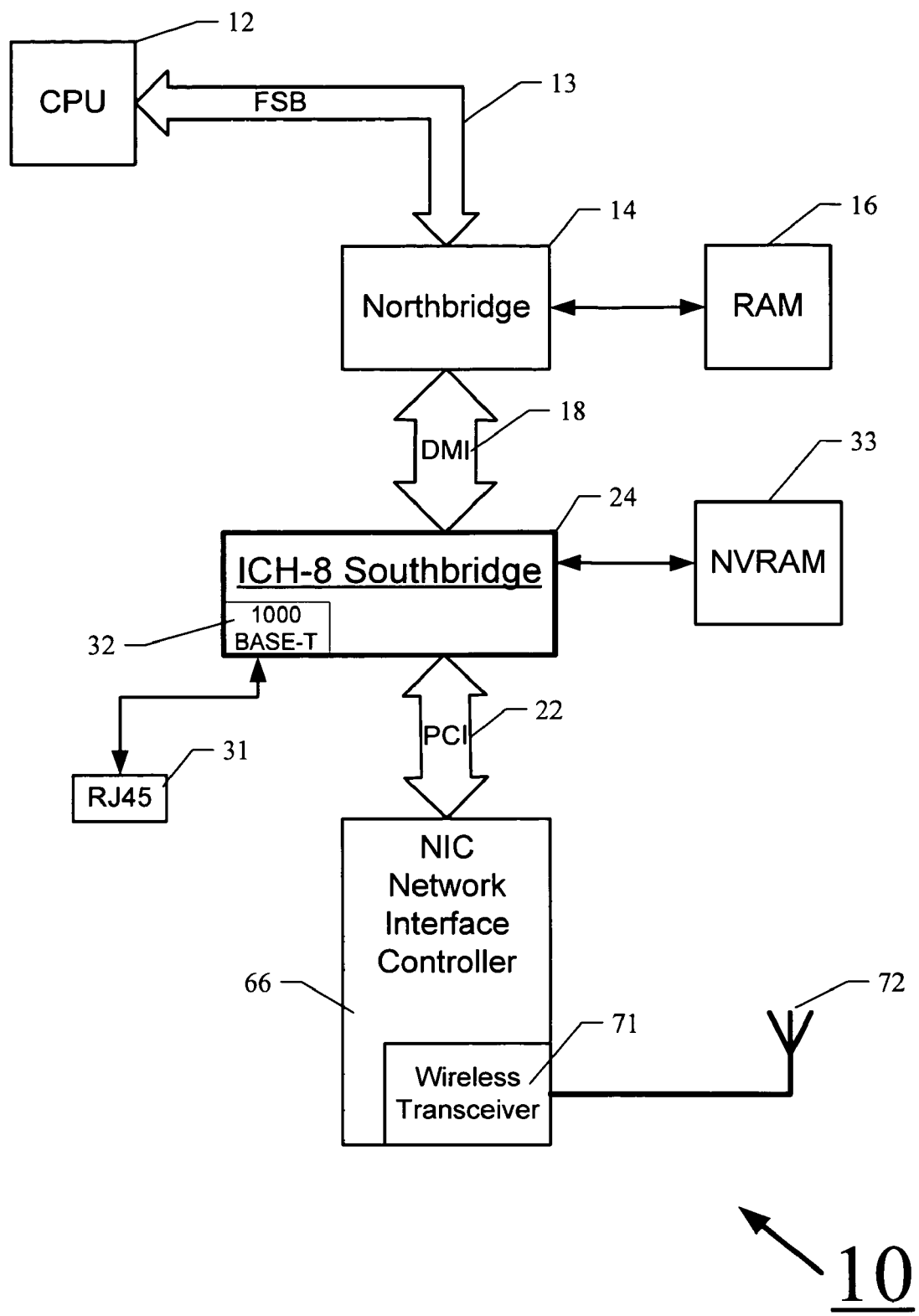
FIG. 1 is a schematic block diagram of an electronic device configured to implement the security functionality according to the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

An exemplary embodiment of the present invention will now be described with reference to the figures. FIG. 1 is a schematic block diagram of an electronic device configured to implement the security functionality according to the present invention.

In an exemplary embodiment, the electronic device 10 may be implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace. The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

The bus controller 14 may also be coupled to a system bus 18, for example a DMI (Direct Media Interface) in typical Intel® style embodiments. Coupled to the DMI 18 may be a so-called Southbridge chip such as an Intel®ICH8 (Input/Output Controller Hub type 8) chip 24

The Southbridge chip 24, may typically incorporate a first NIC (Network Interface Controller) 32 such as of the 1000 BASE-T type of IEEE 802.3 (Institute of Electrical and Electronics Engineers standard number 802.3) interface connecting to an 8PC8 31 (8 positions, 8 contacts) type of wired network connector. An 8PC8 connector 31 is, colloquially known as an RJ45 port and IEEE 802.3 is colloquially known as Ethernet®.

In a typical embodiment, the Southbridge chip 24 may be connected to a PCI (peripheral component interconnect) bus 22 which may in turn be connected to a second NIC 66 which drives a Wireless Transceiver 71. Wireless Transceiver 71 may operate in compliance with IEEE 802.11 or other suitable standards. Wireless Transceiver 71 will typically be coupled to some form of radio antenna 72. Also, typically, Southbridge chip 24 may also be coupled to a NVRAM (non-volatile random-access memory) 33.

Either or both NICs 32 and 66 may convey communications signals that are used to form logical network connections such as to an Internet Service. Indeed a typical computer or similar electronic device 10 may have other interfaces, for example USB (Universal Serial Bus, not shown in FIG. 1) that may in turn connect to (for example) a Bluetooth® transceiver for other modes of communication within the general scope of the invention.

Figure 2:
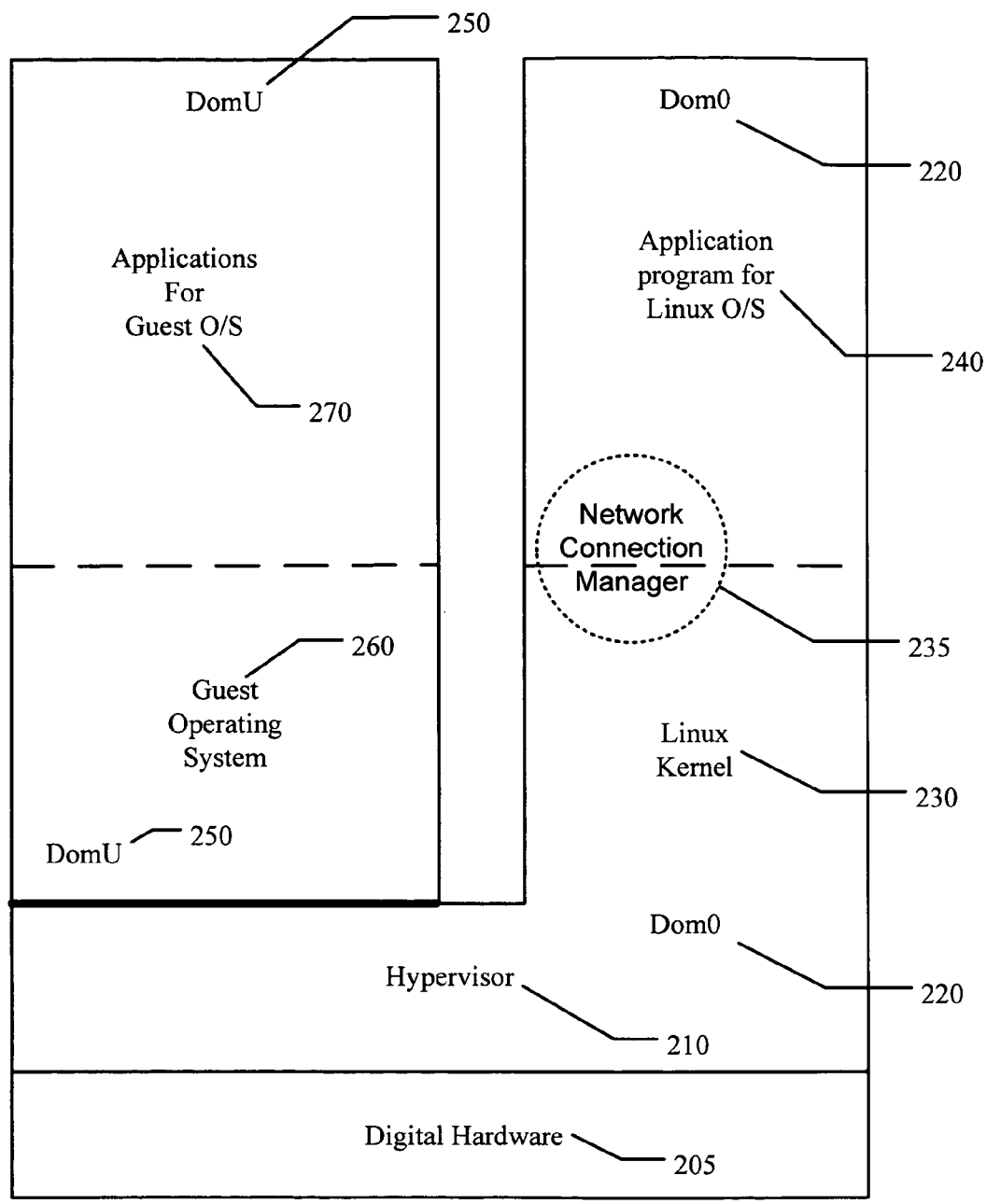
FIG. 2 is a block diagram that shows the architectural structure of components of an embodiment of the present invention.

FIG. 2 is a block diagram that shows the architectural structure 200 of the software components of a typical embodiment of the invention. FIG. 2 does not represent layout order or even juxtaposition in physical memory, rather it illustrates software architectural interrelationship in a typical embodiment of the invention.

In the exemplary embodiment described hereinafter, the hypervisor 210 is found near the bottom of the block diagram to indicate its relatively close architectural relationship with the computer (e.g. digital) hardware 205. The hypervisor 210 forms an important part of Dom0 220, which (in one embodiment of the invention) is a modified version of an entire Xen® and Linux® software stack. However the invention applies equally well to other embodiments in which Dom0 uses an O/S (Operating System) other than Linux®, such as a custom and more rudimentary O/S based on fragments of Linux® with entire subsystems removed.

Dom0 or Domain Zero is a term used in the hypervisor arts to refer to the "privileged domain", which is typically embodied as a VM (Virtual Machine) that has greater privilege than all other domains or VMs (known as DomU 250 for "unprivileged domain"). Within Dom0 lies the Linux® kernel 230 program, upon which the applications 240 programs for running on a Linux® kernel may be found.

Also shown in FIG. 2 is a NCM (Network Connection Manager) 235 which is embodied partly within the Linux® kernel and partly as an application software subsystem. NCM is described in some detail below in the present document.

Generally speaking, an application program 240 (usually only one at a time) running within Dom0 may run partly or wholly in a relatively privileged mode, and such programs are relatively simple and hardened applications in a typical embodiment of the invention. Hardened applications are typically application programs that, by design, are particularly resistant to malware attacks.

Dom0 is thus, in a typical embodiment of the invention, a privileged domain. That is to say that Dom0 runs, at least some of the time, in a privileged CPU mode, for example Ring 0 in IA-32 architecture. In one embodiment, Dom0 comprises the hypervisor, Linux® kernel including I-O (Input/Output) emulation features, and hardened applications. CPU modes and their associated levels of privilege for executing the above-noted features are well known in the relevant art.

Also running under the control of the hypervisor 210 may be an untrusted or unprivileged domain—DomU 250 software. Within the DomU 250 may lie a guest O/S (Operating System) 260, and under the control of the guest O/S 260 may be found (commonly multiple instances of) applications 270 that are compatible with the guest O/S. In an exemplary embodiment of the invention, the guest O/S 260 is the and O/S which is complex and opaque (i.e. Closed Source as contrasted with the more widely known "Open Source" software distribution paradigm).

Figure 3:
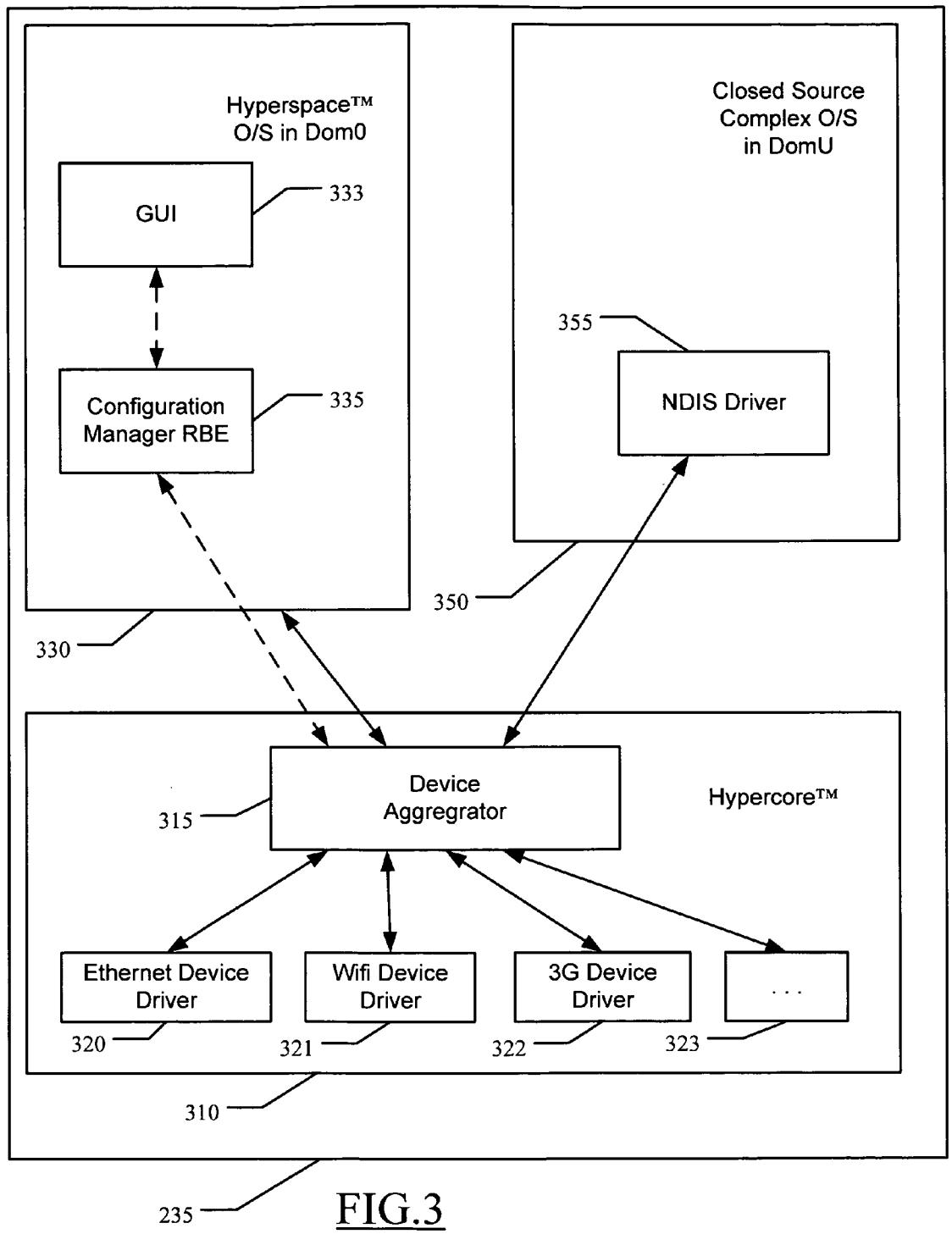
FIG. 3 is a block diagram that shows the interrelationships of component subsystems of a NCM (Network Connection Manager) according the present invention.

FIG. 3 is a block diagram that shows the interrelationships of component subsystems of the NCM (Network Connection Manager) 235 according to an embodiment of the invention. In the exemplary NCM 235 there are at least five components which include: the group of device drivers (320, 321, 322, 323), device aggregator 315, NDIS (Network Driver Interface Specification) driver 355, CM (Configuration Manager) 335 and GUI (graphical user interface) 333. In the exemplary embodiment, device drivers 320 through 323 and device aggregator 315 form part of the Hypercore™ subsystem 310. Similarly, CM (Configuration Manager) 335 and GUI (graphical user interface) 333 form part of the Hyperspace™ subsystem 330 which is implemented within a Dom0 part of the hypervisor system. And likewise, NDIS driver 355 resides in and is part of the Closed Source complex opaque O/S 350. NDIS is well-known in the networking arts. In FIG. 3, network communication paths are shown as solid lines and configuration communication is shown as dashed lines.

Still referring to FIG. 3, device drivers 320, 321, 322, 323 are provided in Hypercore™ 310 for each physical device present in the system. Devices for which device drivers are thus provided may typically include Ethernet®, "Wireless", 3G, USB (Universal Serial Bus) and/or similar suitable devices. 3G refers to the third generation of mobile phone standards based on ITU (International Tele-communication Union) family of standards under IMT-2000 (International Mobile Telecommunications standards 2000).

Typical forms of network connectivity in use today may include various types as shown in Table 1.

TABLE 1

Typical forms of network connectivity in use

| | |
|---|---|
| Wired Ethernet ® | 10 Mbps, 100 Mbps and Gigabit Ethernet ® |
| Wi-Fi | 802.11a, 802.11b, 802.11g, 802.11n |
| Direct Wireless Cellular Broadband | 3G, EDGE, EVDO, HSDPA, 1xRTT, UMTS etc. |
| Indirect Wireless Cellular Broadband | Bluetooth connection to nearby Phone which has Wireless Cellular Broadband |
| Indirect via Wi-Fi | Connection via Wi-Fi to a peer computer which has a connection to the network and acts as a gateway or router. |
| Indirect via wire | Connection via wired Ethernet ® to a peer computer which has a connection to the network and acts as a gateway or router. |

Each type of device typically has characteristics specific to the type; e.g., wireless devices have SSID (service set identifier) and encryption settings, Ethernet® devices have various optimizations for improved performance etc.

The Device Aggregator 315 may unify some or all of the network physical devices present in the system into a single virtual device. Upper layers (configuration manager 335 and NDIS driver 355) may make network communication with only the virtual device that is provided by the network device virtualization capability of the device aggregator 315. As well as providing virtualization services for support of hypothetical (virtual) network devices, the NCM may also provide emulation of real network devices, such as for performance benefits or to Dom0 which may have networking more closely tailored to the specific hardware present.

Depending on heuristics and/or preferences (as specified in configuration manager), device aggregator 315 may use just a selected one of the physical devices for real network communication. For example, if an Ethernet® cable is present and has been (or could be) configured, even if currently any other device is being used for network communications, device aggregator 315 may chose to switch over to using and Ethernet® device driver 320. And since differing devices may have individual characteristics, the interface presented by device aggregator 315 to NDIS driver 355 and to configuration manager 335 may by design and construction allow simplified interaction as well as maximized performance—moreover, a compromise between these somewhat conflicting goals may be needed and implemented accordingly.

In an exemplary embodiment of the invention, NDIS Driver 350 may be embedded in Microsoft® Windows® Vista® O/S as a device driver selected by the device aggregator 315. The device aggregator 315 may change from using one physical device driver (for example 320) to another (for example 321), and the NDIS driver 355 may ideally not even be made "aware" of any change having occurred. However, for performance reasons, it may be desirable to expose some device specific characteristics, such as hardware checksum feature(s), offloading capabilities and the like, and this can be accommodated, perhaps in a manner similar to exigent link reset conditions that may occur on a real (non-virtualized) communications subsystem that uses NDIS.

Configuration Manager 335, is a crucial subsystem, it is a RBE (rule-based engine) or equivalent or similar, and typically it may capture various rules that are used to direct actions device aggregator 315 pursuant to policy rules. For example, it may direct device aggregator 315 to choose (select for use) one particular communications link or device driver in preference to others. For example, it may be that more than one physical device can be used to communicate with the same, or a different, network and the RBE may dictate to choose one on a basis of (money) cost, highest bandwidth or other suitable considerations. Operation of the configuration manager is described further below.

The GUI 333 may present a convenient way for a user to perform rules colligation for example using the configuration manager 335 and/or to review present connection settings.

Thus, the NCM components may use a ruleset, physical location profile and connectivity vector (based on hardware link status). The NCM further provides a Communication module between Dom0 and DomU (wherein is the complex O/S such as Windows®). Whereas the network device on the DomU 350 subsystem may be a simple NDIS driver 355 that implements an emulated Ethernet® device and communicates with Dom0, the device manager on the Dom0 side is typically a kernel module (not shown in FIG. 3).

In the HyperSpace™/HyperCore™ exemplary embodiment of the invention the Configuration Manager 335 subsystem may consolidate the many options and settings of need in connecting to the Internet. It may have certain necessary parameters such as keys, certificates, settings for all the possible devices, and a "prior use history" database.

The Configuration Manager 335 thereby operates to hypothecate and collect setup/configuration prior user choices as to network selection and the like. This information, and more, is colligated (i.e. collected, compiled, recorded and maintained) as a ruleset (set of rules) in a database or other dataset handler as is well-known in the art. In the exemplary embodiment of the invention the GUI 333 (graphical user interface) may interact with a human user in various modes according to the user's choice which may typically be based on expertise and experience with the subject subsystem.

The Configuration Manager 335 keeps information that not only makes connection easier but also enables users to select for use those resources locally located and/or connected. For example, a default printer for a present location may be selected automatically for user usage in response to the connection manager identifying a present location of the computer. Similarly, again for example only, remote devices, such as network disks may be deselected so that their absence does not give rise to difficult, inappropriate or impossible to fulfill prompts urging their reconnection if local substitutes are not to hand.

Some of the information gathered may be set or otherwise manipulated by a user of the GUI and preference settings may likewise be maintained. Other connectivity rules and network status data be interconverted (i.e. mutually updated) as part of a network connection process.

Feedback reflecting a heuristic measure of success of the network connection may likewise be handled. For example a network connection that has persistently functioned with good results and performance may be preferentially selected over one that has rarely if ever worked properly. Nonetheless user input to force the trying of new and never before workable network connections may be needed and may be user-driven. Moreover, patterns of usage are heuristically gathered for preferential or default reuse when a formerly used network connection is reinstated, even if only reinstated partially. This may include VPN (virtual private network) settings and passwords, preferred printers or networked store such as disks, docking devices and other similar appurtenances.

The network device virtualization emulation subsystem of the HyperSpace™/HyperSpace™ exemplary embodiment of the invention also provides for simultaneous use (i.e. sharing where needed) of a single network resource between Dom0 and DomU application stacks that use communication. In particular NCM ensures that the opaque O/S is not able to "hog" the resource so ensuring that the Dom0 stack gets a least a minimum share or fair share (according to policy in force) of the available communications resources, especially the available bandwidth if it is in critically short supply.

Information is made available to at least to Dom0 communications subsystem so that it may adapt its behavior according to the capabilities (and sometimes cost) of the available link. For example a non-urgent download (such as a routine software update) may be deferred while connected to a costly link when there is "reason to believe" that a "free at time of use" may become available later.

The NCM also provides supplication services. Supplication is a well-known term of art in networking; it refers to certain processes of negotiating a network connection. Especially in the internet arts supplication may refer to negotiation of an authenticated IP (internet protocol) based link between a host computer and an ISP (Internet Service Provider), including not merely the IP session itself but higher level protocol functions such as DNS (Domain Name System) provision and so on. Choice of DNS server, SSID and/or the like may be policy based and part of the supplication process. Alternatively some parameters, for example DNS server address, may be obtained automatically, (in that example through the DDNS (dynamic DNS) protocols). The use of policy based connection may also incorporate IPv6 capabilities and information especially since IPv6 is expected to become of increased importance in the future. Supplication may notably, in some cases, include VPN (virtual private network) connections and other services, for example encryption.

Supplication is also heuristic, for example in that the rules may take into account whether a connection should be re-established (such as if a prior session was recent or collocated) or an entire new connection tried and used. Moreover, when a network connection is established successfully, further information beyond the mere fact of connection may become available. This secondary consequential data (or sequellae) may then be used to modify the ruleset to heuristically reflect the increased knowledge of the link thus obtained.

Figure 4:
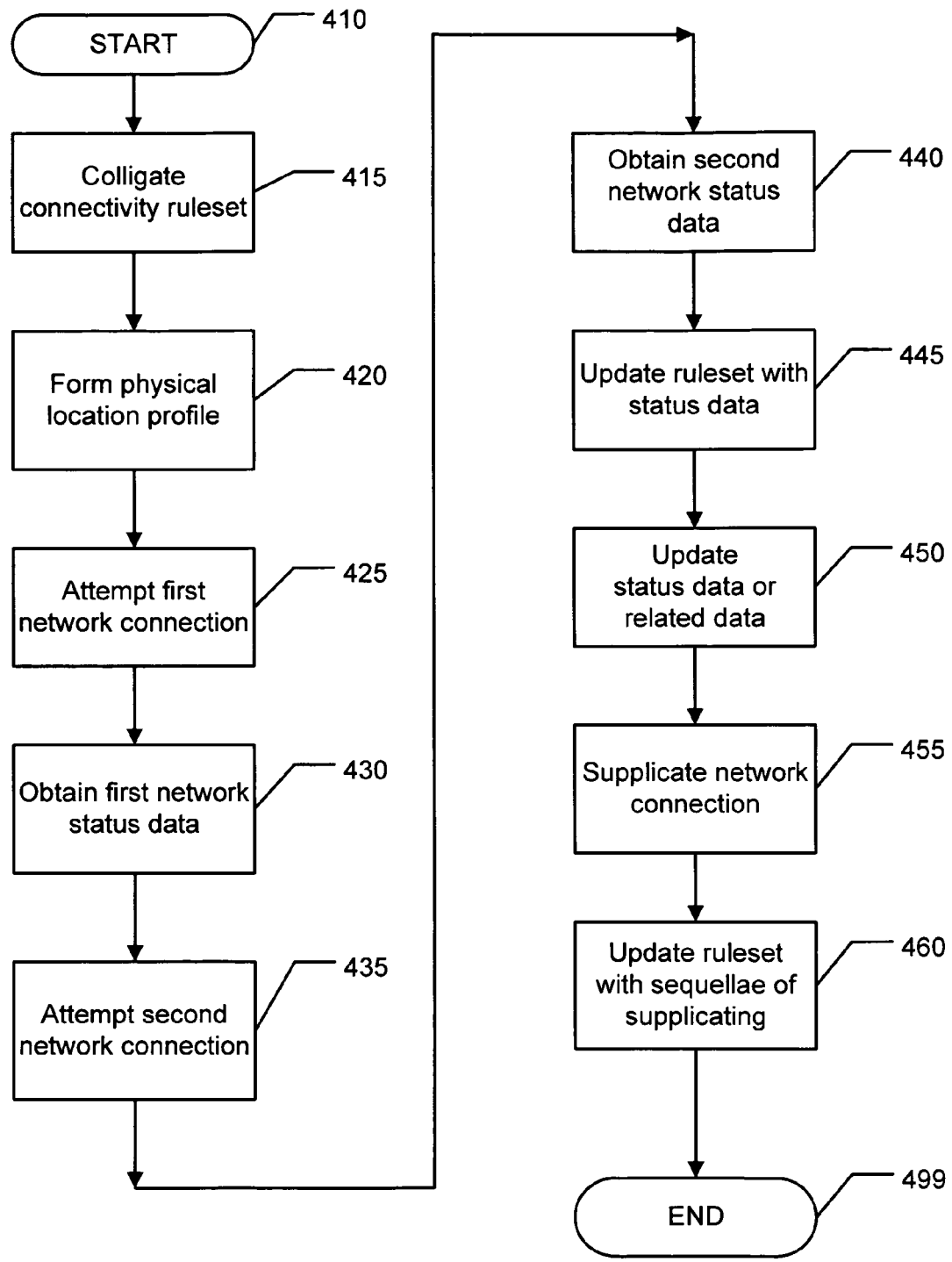
FIG. 4 is a flowchart illustrating the steps performed in implementing an iterative approach to selecting and initializing network services according to the present invention.

FIG. 4 is a flowchart illustrating the steps performed in implementing an iterative approach to selecting and initializing network services according to an embodiment of the present invention and conforming, in large part, to the description of the configuration manager given above.

In step 410, in the exemplary method, entry is made into a method that is part of the NCM (Network Connection Manager) in the exemplary embodiment of the invention.

At step 410, the method starts. At step 415, a connectivity ruleset is colligated, including collecting, compiling and recording the ruleset. There are various techniques available in the arts for managing rulesets. Commonly they may be stored using any of a number of types of database and a GUI (Graphical User Interface) may be provided to allow human intervention in entering, editing, and occasionally pruning of ruleset contents. However rulesets may be adaptively modified according to operating conditions and exigencies.

In an embodiment of the invention, a ruleset may provide a policy that may be interpreted typically to guide and/or control network connections, for example at a session level. The ruleset serves to allow a rule-based engine to select and activate communications and network links as described below. Many criteria may be included in the ruleset, for example high-speed or low latency links may be preferred over lower performing links. It may be that cost, or marginal cost of usage are important and, for example, free at time of use links preferred over expensive links even if a performance hit results.

At step 420, a physical location profile is formed. This can relate, in some sense, to whereabouts the computer finds itself, especially since the NCM is particularly well adapted to use within mobile computers such as laptop computers. Physical location may be determined in any of a number of ways and does not necessarily, or even usually, refer to a latitude/longitude pair (or any measure equivalent thereto) unless perhaps the computer is equipped with operable GPS (global positioning by satellite) facilities. As a further example, if the computer is at its home location, it may be connected to a wired 10Base100 connection such as is common in the art and which home connection might be expected to be preferred within the context of the rules-based engine.

One important consideration in determining physical location may be a comparison between present physical location and that when the computer was previously brought to operability and/or when a network link was most recently established anew. Again this may have more to do with the availability and operability of particular preferred networks than geographical location. The time duration may be a significant factor too. If only a very small time has elapsed then it is likely, but not certain, that the networks available will be substantially the same and decisions at to connectivity previously made can be positioned favorably for reinstatement.

The above described considerations, and more, may allow compilation of a list of candidate network links that may, or may not, be selected for attempted use as described below.

Optionally, based on what may be loosely described as location information then and in accordance with the ruleset, a first candidate link may be selected and its operability determined. Sometimes the selection is obvious, that is requiring minimal considerations and minimum action. For example, if a 10Base1000 (Ethernet®) port detectably has no cable connected thereto it is quickly dismissible as inoperable and need not be tested further in order to eliminate it for use as a network connection under the presently prevailing operating conditions. On the other hand, in some cases it will be necessary to go at least some way, if not all the way, to establishing a network connection in order to determine whether it is the selected "best" network to use.

Sometimes establishing a connection will cost money and if policy were to dictate that "free at time of use" connections are to be preferred then a "for money" connection would be deferred until and unless other "free at time of use" networks were eliminated as candidates. Thus, referring again to FIG. 4, at step 425, an attempt is made to complete a first candidate network connection. Such an attempt is likely to yield useful network status data which, when obtained (step 430) will be held for link evaluation and selection.

The process of forming a location profile, attempting a network connection and obtaining network status data are then repeated for a second network connection (steps 435, 440, 445) and optionally (and commonly) for further network connections. Some network connections may typically have a returned status of inoperable, unavailable or similar and will be eliminated as candidates for selection as the network to be used in the present computing session.

Next, as a means of applying the policies the status data collected for the various links is interpreted in the light of the rules in the ruleset. As the rules are applied to the status data (step 445), so the status data is applied to the rules (step 450). One may call this a process of interconverting or mutually updating. But the effect is desirably a iterative process in which there is an increasingly optimized heuristic approach towards selecting a progressively more preferred network selected responsive to the present network exigencies, the policies embodied in the ruleset, preferences captured via the GUI and choices and electives as the which network(s) is/are to used and further to be regarded as increasingly favored in the future.

At step 455, network connection is supplicated typically including session negotiation and binding in conformance with the networking protocols temporally in force.

At step 460, a ruleset is updated with the sequellae of the supplicating action, thus providing, for example, historical performance, operability and/or cost data for use in heuristic development of rulesets. And at step 499 the method ends.

With regards to FIG. 5, computer instructions to be incorporated into in an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

FIG. 6 shows how an exemplary embodiment of the invention may be encoded, transmitted, received and decoded using electromagnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electromagnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies devices could also be used to construct alternative embodiments of the invention.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method comprising:
    colligating, by a computer, a connectivity ruleset comprising a plurality of connectivity rules;
    evaluating, by the computer, status data for at least a first network data connection and a second network data connection with respective connectivity rules in the connectivity ruleset to select a communication link from a plurality of candidate communication links;
    supplicating, by the computer, a network connection for the selected candidate communication link; and
    updating the connectivity ruleset responsive to consequential data provided due to the supplicating.

2. The method of claim 1 further comprising:
    forming a physical location profile for at least one of the candidate communication links wherein
    the selected one of the candidate communication links is selected according to the physical location profile.

3. The method of claim 2 wherein:
    the selected one of the candidate communication links is selected dependent upon a present physical location of the computer.

4. The method of claim 1 wherein:
    the colligating step comprises providing a graphical user interface for maintenance of connectivity data under user guidance.

5. The method of claim 4 wherein:
    the connectivity data comprises data to specify link type and link characteristics for the connectivity rules.

6. The method of claim 4 wherein:
    the connectivity data comprises data to specify a protocol and to specify an encryption technique for a respective communication link.

7. The method of claim 4 wherein:
    the connectivity data further includes access data to be re-propagated within the supplicating step.

8. The method of claim 7 wherein:
    the data to be re-propagated within the supplicating step further includes an internet protocol address of a Domain Name System server.

9. The method of claim 4 wherein:
    the connectivity data further includes data to specify IPv 6 (internet protocol version six) capabilities for selected ones of the connectivity rules.

10. The method of claim 1, further comprising:
    using the updated connectivity ruleset to select a communication link from another plurality of candidate communication links as the computer changes physical locations.

11. The method of claim 1, wherein the colligating, the evaluating, the supplicating, and the updating are performed by a network connection manager in the computer, wherein the network connection manager has a component that is part of a domain zero associated with a hypervisor.

12. The method of claim 1, wherein the connectivity rules specify preference of one of the candidate communication links over another of the candidate communication links.

13. The method of claim 1, wherein the connectivity rules specify preference among the plurality of candidate communication links based on speeds and costs of the candidate communication links.

14. A computer program product comprising:
    at least one non-transitory computer-readable medium having instructions encoded therein, the instructions when executed by at least one processor cause said at least one processor to
    operate for context based virtualization by steps comprising:
        colligating a connectivity ruleset comprising a plurality of connectivity rules;
        interconverting status data for at least a first network data connection and a second network data connection with respective connectivity rules in the connectivity ruleset to form a dataset that represents a plurality of candidate communication links;
        supplicating a network connection for a selected one of the candidate communication links; and
        adaptively updating the ruleset responsive to a sequella of the supplicating step.

15. The computer program product of claim 14 wherein:
    the selected one of the candidate communication links is selected according to contents of the dataset.

16. An electronic device comprising:
a controller; and
a memory having instructions encoded therein, the instructions when executed by the controller cause said controller to:
   colligate a connectivity ruleset comprising a plurality of connectivity rules;
   interconvert status data for at least a first network data connection and a second network data connection with respective connectivity rules in the connectivity ruleset to form a dataset that represents a plurality of candidate communication links;
   supplicate a network connection for a selected one of the candidate communication links; and
   adaptively update the ruleset responsive to a sequella of the supplicating step.

17. The electronic device of claim 16 wherein the selected one of the candidate communication links is selected according to contents of the dataset.

18. The electronic device of claim 16 wherein the memory is a non-volatile memory.

19. The electronic device of claim 16, further comprising:
a hypervisor;
a domain zero associated with the hypervisor;
wherein the instructions are part of a network connection manager, the network connection manager having a component in the domain zero.

20. A non-transitory computer-readable storage medium storing instructions that upon execution cause a computer to:
   colligate a connectivity ruleset comprising a plurality of connectivity rules;
   evaluate status data for at least a first network data connection and a second network data connection with respective connectivity rules in the connectivity ruleset to select a communication link from a plurality of candidate communication links;
   supplicate a network connection for the selected one of the candidate communication links; and
   update the connectivity ruleset responsive to consequential data provided due to the supplicating.

* * * * *